(12) United States Patent
Liao

(10) Patent No.: US 7,789,004 B2
(45) Date of Patent: Sep. 7, 2010

(54) BAND SAW MACHINE

(76) Inventor: Hui-Chuan Liao, No. 396, Yung-Ming Rd., Ta-Li City, Taichung Hsien (TW)

( * ) Notice: Subject to any disclaimer, the term of this patent is extended or adjusted under 35 U.S.C. 154(b) by 338 days.

(21) Appl. No.: 11/900,107

(22) Filed: Sep. 10, 2007

(65) Prior Publication Data

US 2008/0060207 A1 Mar. 13, 2008

(30) Foreign Application Priority Data

Sep. 13, 2006 (TW) ................................ 95216308 U

(51) Int. Cl.
*B27B 13/08* (2006.01)
(52) U.S. Cl. ............................... 83/816; 83/814; 83/788
(58) Field of Classification Search ................... 83/788, 83/814, 816, 817, 818, 809; 30/380, 513
See application file for complete search history.

(56) References Cited

U.S. PATENT DOCUMENTS

| | | | | |
|---|---|---|---|---|
| 1,967,724 A | * | 7/1934 | Ponton ......................... | 83/817 |
| 2,969,815 A | * | 1/1961 | Lasar .......................... | 83/818 |
| 4,311,074 A | * | 1/1982 | Titus ........................... | 83/816 |
| 7,311,029 B2 | * | 12/2007 | Behne ......................... | 83/816 |
| 7,493,842 B2 | * | 2/2009 | Feng ........................... | 83/816 |
| 2003/0005805 A1 | * | 1/2003 | Lee .......................... | 83/699.51 |
| 2004/0154454 A1 | * | 8/2004 | Lee ............................. | 83/788 |
| 2004/0168555 A1 | * | 9/2004 | Donovan et al. .............. | 83/13 |

* cited by examiner

*Primary Examiner*—Laura M. Lee
(74) *Attorney, Agent, or Firm*—The Webb Law Firm

(57) ABSTRACT

A band saw machine includes a machine frame unit with a longitudinal guideway, a cam follower movable along the guideway, a wheel mount movable with the cam follower between closer and remote positions relative to a first wheel mounted on the machine frame unit, a biasing member disposed to bias the wheel mount to the remote position, a second wheel mounted on the wheel mount, a band saw blade trained on the wheels, and an actuating shaft with a cam end which engages the cam follower. The wheel mount can be kept in the closer position with a friction force that counteracts the biasing force of the biasing member by turning the actuating shaft so as to permit replacement of the band saw blade.

6 Claims, 6 Drawing Sheets

BAND SAW MACHINE

CROSS-REFERENCE TO RELATED APPLICATION

This application claims priority of Taiwanese Application No. 095216308, filed on Sep. 13, 2006.

BACKGROUND OF THE INVENTION

1. Field of the Invention

This invention relates to a band saw machine, more particularly to a band saw machine which permits quick and easy replacement of a band saw blade.

2. Description of the Related Art

Referring to FIGS. 1 and 2, a conventional band saw machine 1 is shown to include a machine frame 11 which has an upright frame body 111 and a sliding channel 112 formed in the frame body 111. A band saw blade unit 12 includes two first wheels 121 and a second wheel 122 spaced apart from each other, and a band saw blade 123 trained on the first and second wheels 121, 122. The first wheels 121 are rotatably disposed on the frame body 111 about their respective axes. A movable seat 13 extends and is disposed slidably in the sliding channel 112. The second wheel 122 is rotatably disposed on the movable seat 13 about its axis.

A releasing and replacing unit 14 includes a positioning shaft 141 which extends upwardly from the movable seat 13 and which is exposed from a top face of the frame body 111, and a compression spring 142. The positioning shaft 141 has a shaft body 143 which is connected to the movable seat 13 at one end thereof, and an abutting head 144 which is disposed on the other end of the shaft body 143 opposite to the movable seat 13. The compression spring 142 has two opposite ends abutting against the frame body 111 and the abutting head 144, respectively.

In use, the first and second wheels 121,122 rotate and move the band saw blade 123 for cutting an article. After a period of use, the band saw blade 123 will be worn out and become blunt, and thus often needs replacement. During replacement, the abutting head 144 is pressed downwards to cause the second wheel 122 to move toward the first wheel 121, so that the band saw blade 123 can be released, and the user can replace the band saw blade 123.

Although the aforesaid band saw machine permits replacement of the band saw blade 123, it still has the following drawbacks:

In order to prevent slippage of the band saw blade 123 during operation of the first and second wheels 121,122, the compression spring 142 has a very large biasing force. Hence, when replacing the band saw blade 123, a very great force is required to press the abutting head 144 downwards. Moreover, the abutting head 144 is relatively high, so that the user needs to raise his/her hand up high and press the abutting head 144 with a large force, which is inconvenient and laborious.

SUMMARY OF THE INVENTION

The object of the present invention is to provide a band saw machine which requires less effort and which permits easy application of force.

According to this invention, the band saw machine includes a mounting frame unit having first and second frames which are spaced apart from each other in a longitudinal direction to define a working space. The second frame has a guideway which extends in the longitudinal direction. A worktable is disposed on the first frame, extends in a first transverse direction relative to the longitudinal direction, and confronts the working space for supporting a workpiece to be worked thereon. A first wheel is mounted on and is rotatable relative to the first frame about a first rotating axis in the first transverse direction. A cam follower is disposed to be moved along the guideway. A wheel mount is disposed to be moved with the cam follower so as to displace from a closer position to a remote position relative to the first wheel. A biasing member is disposed to bias the wheel mount to the remote position with a biasing force that is exerted along a force line in the longitudinal direction. A second wheel is mounted on and is rotatable relative to the wheel mount about a second rotating axis that is parallel to the first rotating axis. An endless band saw blade is trained on the first and second wheels such that, when the wheel mount is in the remote position, the endless band saw blade is tensed and is dragged by the first and second wheels to move across the working space along the longitudinal direction for working the workpiece when the first wheel is driven to rotate. An actuating shaft is mounted on and is turnable relative to the second frame about a pivot axis parallel to the second rotating axis, and has a cam end and an operated end. The cam end has an eccentric cam surface which has proximate and distal points. The proximate and distal points respectively have smaller and larger radii relative to the pivot axis, and are angularly displaced from each other about the pivot axis such that, by turning the operated end, one of the proximate and distal points are brought to engage the cam follower to thereby place the wheel mount in a corresponding one of the remote and closer positions, and such that once the distal point is brought to engage the cam follower at a pressed position with a friction force, the pressed position is aligned with the force line to enable the friction force to counteract the biasing force in the longitudinal direction, thereby keeping the wheel mount in the closer position.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
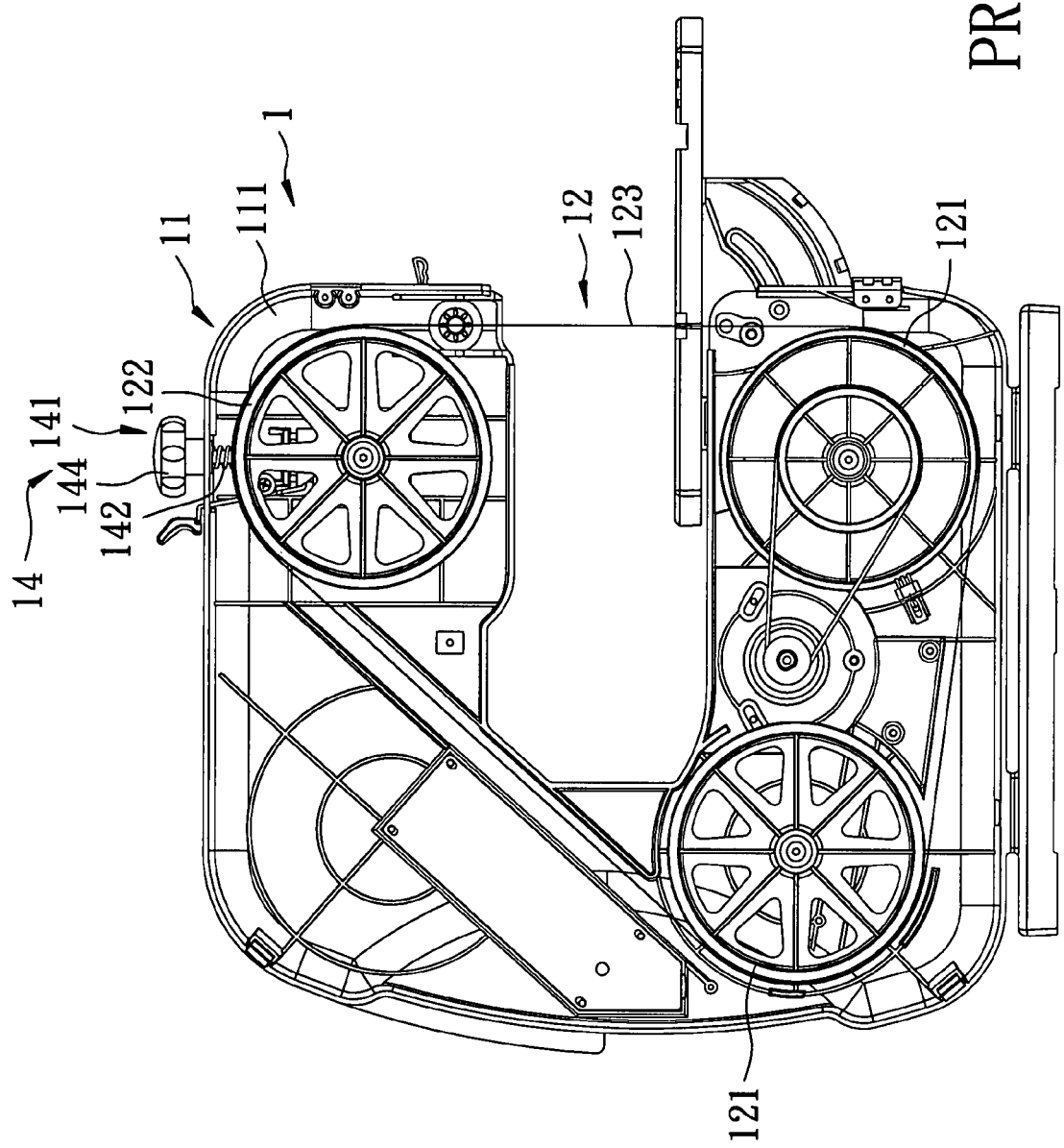
FIG. 1 is a schematic front view of a conventional band saw machine.
Figure 2:
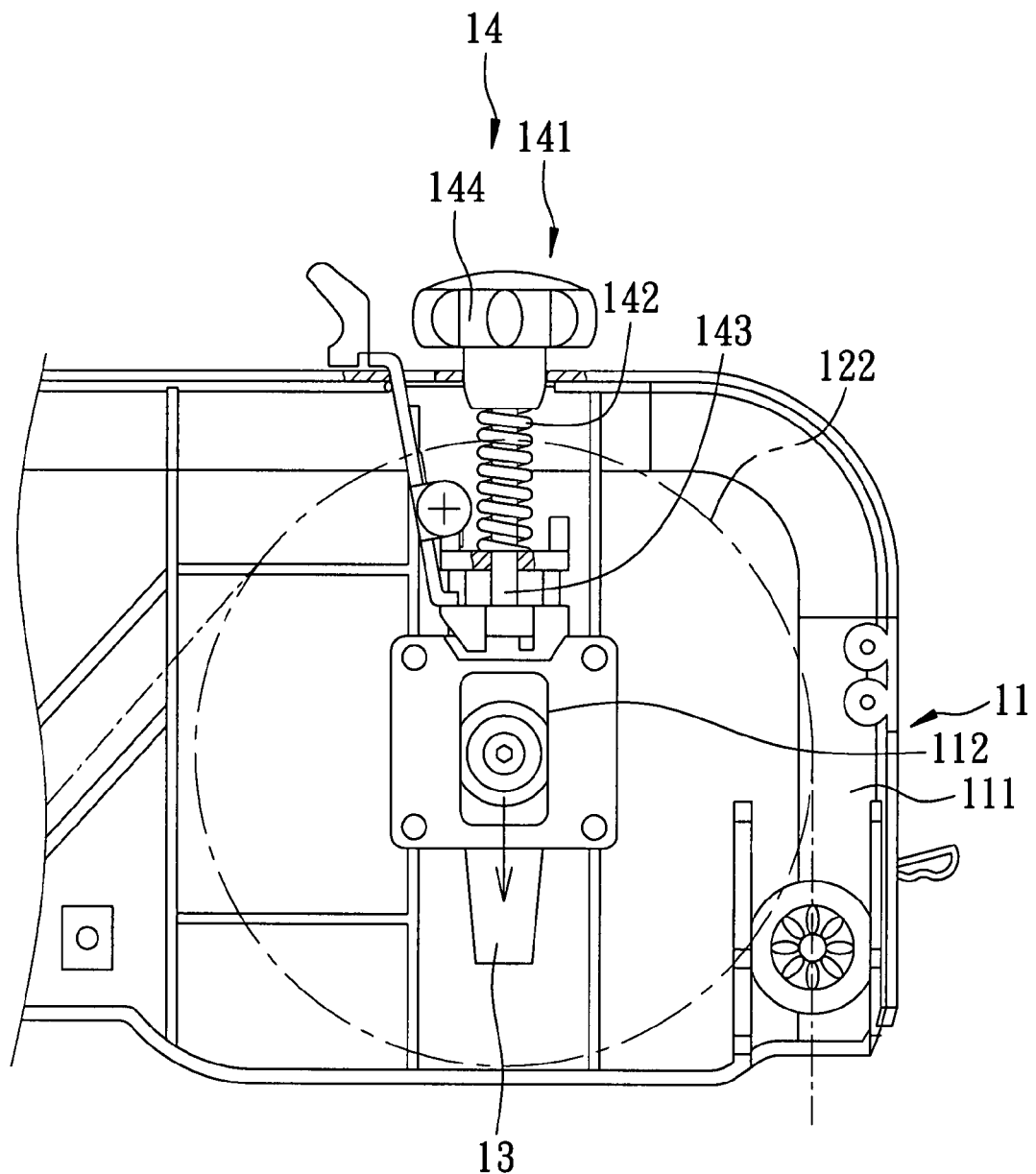
FIG. 2 is a fragmentary front view illustrating a releasing and replacing unit of the conventional band saw machine.
Figure 3:
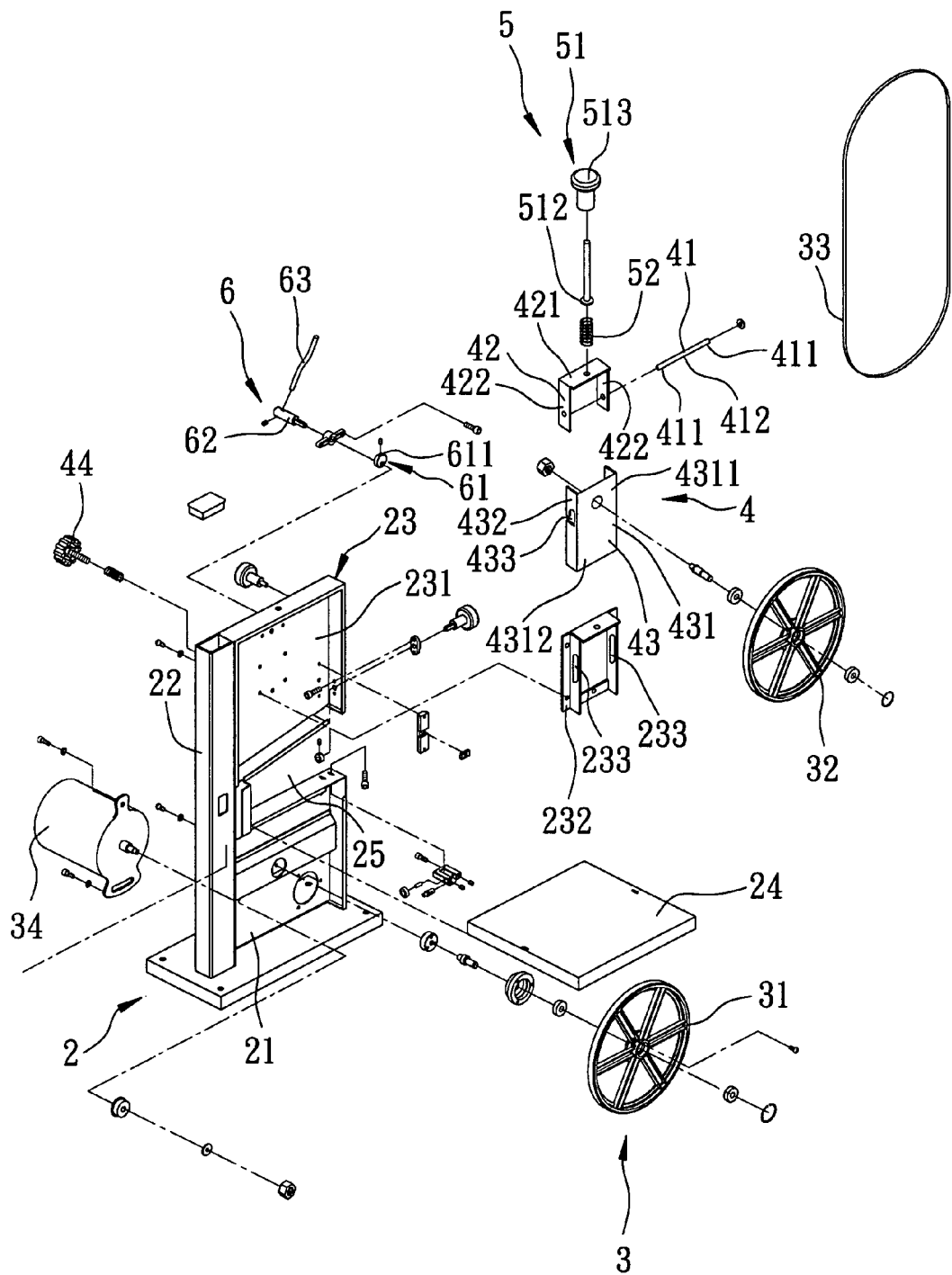
FIG. 3 is an exploded perspective view of a preferred embodiment of a band saw machine according to this invention.
Figure 4:
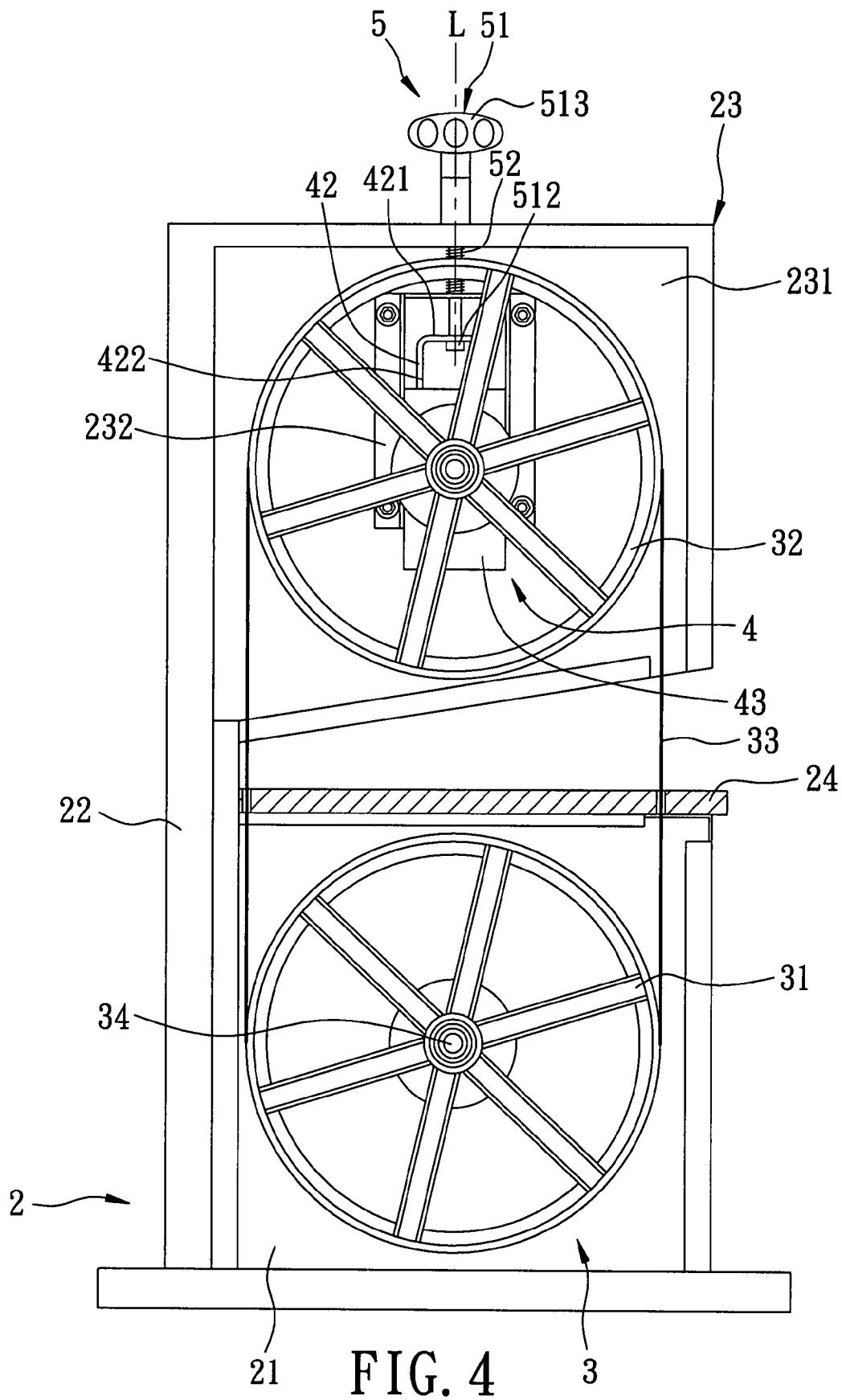
FIG. 4 is a schematic front view of the preferred embodiment, illustrating the operation thereof.
Figure 5:
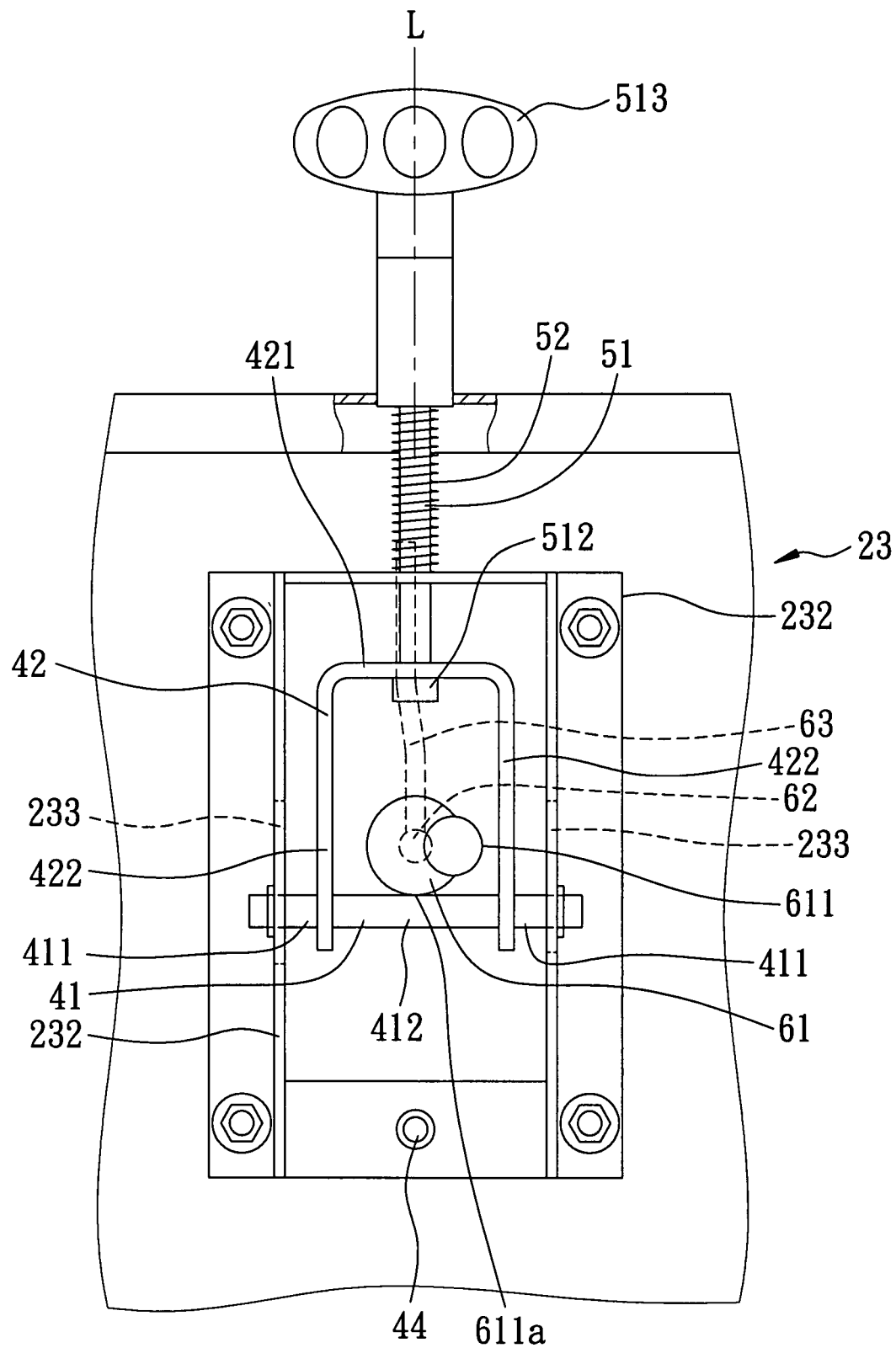
FIG. 5 is a fragmentary front view of the preferred embodiment, illustrating an actuating shaft in a normal state.

Referring to FIGS. 3 to 5, the preferred embodiment of a band saw machine according to the present invention is shown to comprise a mounting frame unit 2, a band saw blade unit 3, a movable unit 4, a biasing unit 5, and an actuating unit 6.

The mounting frame unit 2 has first and second frames 21,23 which are spaced apart from each other in a longitudinal direction to define a working space 25. The second frame 23 has a main frame 231 which is coupled with the first frame 21 by means of a lateral frame 22, and a fixed frame 232 which is disposed in the main frame 231. The fixed frame 232 has left and right key slots 233 which extend in the longitudinal direction to serve as a guideway. A worktable 24 is disposed on the first frame 21, extends in a first transverse direction relative to the longitudinal direction, and confronts the working space 25 for supporting a workpiece (not shown) to be worked thereon.

The band saw blade unit 3 includes a first wheel 31 which is mounted on and which is driven by a driving motor 34 to rotate relative to the first frame 31 about a first rotating axis in the first transverse direction, a second wheel 32, and an endless band saw blade 33 which is trained on the first and second wheels 31,32.

The movable unit 4 includes a wheel mount 43, a cam follower 41, and a force aligning member 42. The wheel mount 43 has a major mounting wall 431 which extends in a second transverse direction transverse to the longitudinal and first transverse directions to terminate at left and right edges, and on which the second wheel 32 is rotatably mounted about a second rotating axis parallel to the first rotating axis, and left and right side walls 432 which respectively extend from the left and right edges of the major mounting wall 431 in the first transverse direction. The left and right side walls 432 respectively have hook slots 433. Further, the major mounting wall 431 extends in the longitudinal direction to terminate at upper and lower edges 4311, 4312.

The cam follower 41 is formed as a pin 41 which has left and right ends 411 that are journalled respectively on the left and right side walls 432 by means of the hook slots 433, and an intermediate segment 412 that is interposed between the left and right ends 411. The left and right ends 411 extend respectively and outwardly of the left and right side walls 432 of the wheel mount 43 through the hook slots 433 to serve as left and right keys, so as to slide along and to be guided by the left and right key slots 233, respectively.

Preferably, the left and right side walls 432 of the wheel mount 43 are loosely journalled on the left and right ends 411 of the pin 41 such that the lower edge 4312 is permitted to turn about an axis of the pin 41 so as to render the wheel mount 43 angularly adjustable about the axis of the pin 41.

An adjusting threaded bolt 44 is rotatably mounted to the second frame 23, and has operated and abutting ends which are respectively disposed at two sides of the second frame 23 in the first transverse direction. The abutting end is disposed to abut against the lower edge 4312 of the major mounting wall 431 of the wheel mount 43 such that screwing movement of the threaded bolt 44 results in turning of the lower edge 4312 so as to permit angular adjustment of the wheel mount 43, thereby making the second rotating axis of the second wheel 32 parallel to the first rotating axis of the first wheel 31.

Preferably, the left and right ends 411 of the pin 41 are detachably and respectively mounted on the left and right side walls 432 of the wheel mount 43 to facilitate assembly and disassembly of the wheel mount 43 to and from the fixed frame 232.

The force aligning member 42 includes a crosspiece 421 with a center, and left and right legs 422 which respectively extend from the crosspiece 421 and which are respectively inboard to the left and right side walls 432 of the wheel mount 43 to permit the left and right ends 411 of the pin 41 to be respectively journalled thereon. The center of the crosspiece 421 and a middle point of the intermediate segment 412 of the pin 41 are substantially in line with a force line (L) in the longitudinal direction.

The biasing unit 5 includes a positioning shaft 51 and a biasing member 52. The positioning shaft 51 has a connecting end 512 connected to the center of the crosspiece 421, and extends along the force line (L) to terminate at an enlarged head 513 that is disposed outwardly of the second frame 23. The biasing member 52 is a coil spring 52 which is disposed to surround the positioning shaft 51 and which has two biasing ends that respectively abut against the fixed frame 232 and the enlarged head 513 so as to provide a biasing force that is exerted along the force line (L) to bias the positioning shaft 51, the force aligning member 42 and the pin 41 away from the first wheel 31.

Figure 6:
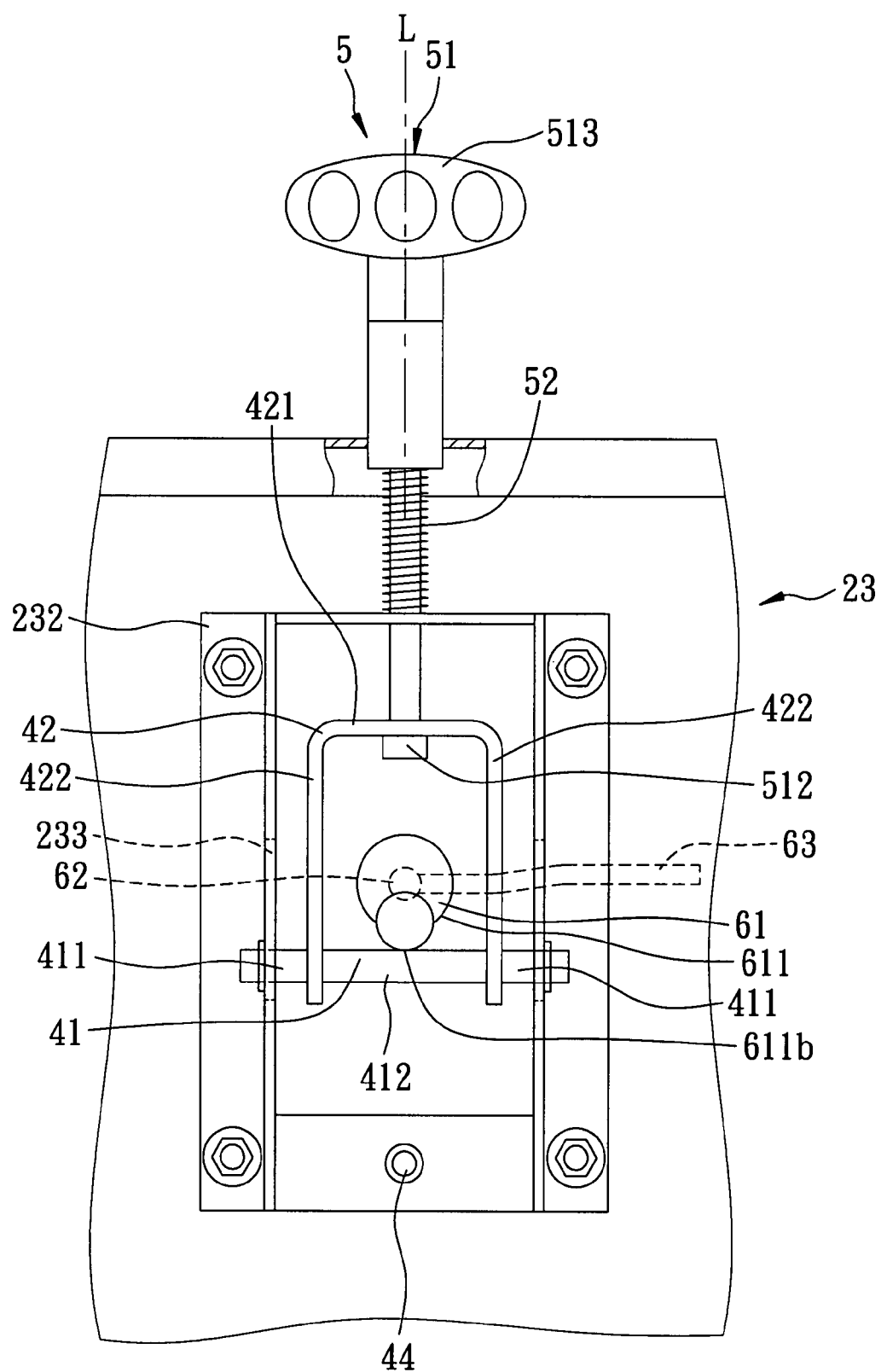
FIG. 6 is a view similar to FIG. 5, illustrating the actuating shaft in a replacement state.

The actuating unit 6 includes an actuating shaft 62 which is mounted on and which is turnable relative to the second frame 23 about a pivot axis parallel to the second rotating axis, and which has a cam end 61 and an operated end 63. The cam end 61 has an eccentric cam surface 611 which has proximate and distal points (611a, 611b). Referring to FIGS. 5 and 6, the proximate and distal points (611a,611b) respectively have smaller and larger radii relative to the pivot axis, and are angularly displaced from each other about the pivot axis. By turning the operated end 63, one of the proximate and distal points (611a, 611b) is brought to engage the intermediate segment 412 of the pin 41 at the middle point to thereby place the wheel mount 43 in a corresponding one of remote and closer positions relative to the first wheel 31.

In use, referring to FIGS. 3 to 5, the wheel mount 43 is kept in the remote position by the biasing force of the coil spring 52 such that the band saw blade 33 is tensed and is dragged by the first and second wheels 31,32 to move across the working space 25 along the longitudinal direction for working a workpiece when the first wheel 31 is driven to rotate.

With reference to FIGS. 4 and 6, when the band saw blade 33 is worn and blunted, the user can apply a force to the operated end 63 to turn the cam surface 611 such that the distal point (611b) is brought to engage the intermediate segment 412 of the pin 41 at the middle point (corresponding to a pressed position) with a friction force, whereby the middle point (the pressed position) is aligned with the force line (L) to enable the friction force to counteract the biasing force of the coil spring 52 in the longitudinal direction so as to keep the wheel mount 43 in the closer position even when the force applied to the operated end 63 is removed. The user can therefore remove the worn band saw blade 33 and replace it with a new one.

In order to avoid undesired releasing of the band saw blade 33 during operation of the first and second wheels 31, 32, the biasing force of the coil spring 52 is required to be very large. With the present invention, due to the principle of lever, the user can easily turn the actuated shaft 62 to move and keep the wheel mount 43 in the closer position so that the user can easily and effortlessly replace the band saw blade 33. Moreover, the operated end 63 can be disposed at a relatively low position, so that the user can manipulate the operated end 63 without having to raise his/her hand too high. Furthermore, if the first and second wheels 31, 32 are not parallel to each other, the user can rotate the adjusting threaded bolt 44 to make the first wheel 31 parallel to the second wheel 32 to prevent undesired slippage of the band saw blade 33, thereby ensuring safe operation of the band saw machine.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A band saw machine comprising:

a mounting frame unit having first and second frames which are spaced apart from each other in a longitudinal direction to define a working space, said second frame having a guideway which extends in the longitudinal direction;

a worktable which is disposed on said first frame, which extends in a first transverse direction relative to the longitudinal direction, and which confronts said working space for supporting a workpiece to be worked thereon;

a first wheel which is mounted on and which is rotatable relative to said first frame about a first rotating axis in the first transverse direction;

a cam follower disposed to be moved along said guideway;

a wheel mount disposed to be moved with said cam follower as to be displaced from a closer position to a remote position relative to said first wheel;

a biasing member which is disposed to bias said wheel mount to the remote position with a biasing force that is exerted along a force line in the longitudinal direction;

a second wheel which is mounted on and which is rotatable relative to said wheel mount about a second rotating axis that is parallel to the first rotating axis;

an endless band saw blade which is trained on said first and second wheels such that, when said wheel mount is in the remote position, said endless band saw blade is tensed and is dragged by said first and second wheels so as to move across said working space along the longitudinal direction for working the workpiece when said first wheel is driven to rotate; and an actuating shaft which is mounted on and which is turnable relative to said second frame about a pivot axis parallel to the second rotating axis, and which has a cam end and an operated end, said cam end having an eccentric cam surface which has proximate and distal points, said proximate and distal points respectively having smaller and larger radii relative to the pivot axis, and being angularly displaced from each other about the pivot axis such that, by turning said operated end, one of said proximate and distal points is brought to engage said cam follower to thereby place said wheel mount in a corresponding one of the remote and closer positions, and such that once said distal point is brought to engage said cam follower at a pressed position with a friction force, said pressed position is aligned with the force line to enable the friction force to counteract the biasing force in the longitudinal direction, thereby keeping said wheel mount in the closer position;

said wheel mount including a major mounting wall which extends in the second transverse direction to terminate at left and right edges, and on which said second wheel is rotatably mounted, and left and right side walls which respectively extend from said left and right edges in the first transverse direction;

said cam follower being formed as a pin which has left and right ends journalled respectively on said left and right side walls, and an intermediate segment that is interposed between said left and right ends to engage one of said proximate and distal points at a middle point of said intermediate segment which corresponds to the pressed position;

said band saw machine further comprising a force aligning member which has a crosspiece that receives the biasing force at a center thereof, said center and said middle point of said intermediate segment being substantially in line with the force line, said force aligning member further having left and right legs which extend respectively from said crosspiece, and which are respectively inboard to said left and right side walls of said wheel mount to permit said left and right ends of said pin to be respectively journalled thereon.

2. The band saw machine according to claim 1, wherein said left and right ends of said pin extend respectively and outwardly of said left and right side walls of said wheel mount to respectively serve as left and right keys, said guideway being configured to have left and right key slots which extend respectively in the longitudinal direction to respectively guide said left and right keys.

3. The band saw machine according to claim 2, wherein said major mounting wall of said wheel mount extends in the longitudinal direction to terminate at upper and lower edges, said left and right side walls of said wheel mount being configured to loosely journal said left and right ends of said pin such that said lower edge is permitted to turn about an axis of said pin so as to render said wheel mount angularly adjustable about the axis of said pin.

4. The band saw machine according to claim 3, wherein said left and right ends of said pin are respectively and detachably mounted on said left and right side walls of said wheel mount.

5. The band saw machine according to claim 3, further comprising an adjusting threaded bolt which is rotatably mounted to said second frame and which has operated and abutting ends that are respectively disposed at two sides of said second frame in the first transverse direction, said abutting end being disposed to abut against said lower edge of said major mounting wall of said wheel mount such that screwing movement of said threaded bolt results in turning of said lower edge so as to permit angular adjustment of said wheel mount.

6. The band saw machine according to claim 1, further comprising a positioning shaft which extends from the center of said crosspiece along the force line and which terminate at an enlarged head that is disposed outwardly of said second frame, said biasing member being a coil spring which is disposed to surround said positioning shaft and which has two biasing ends that respectively abut against said second frame and said enlarged head so as to bias said wheel mount to the remote position.

* * * * *